July 11, 1944.  E. C. STEFFENS  2,353,521
MILK BOTTLE CREAM DISPENSER
Filed Feb. 10, 1941
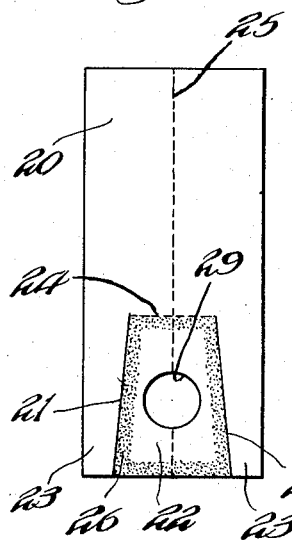
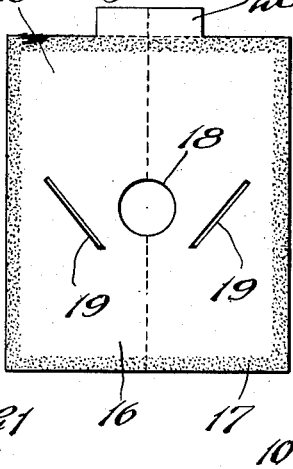
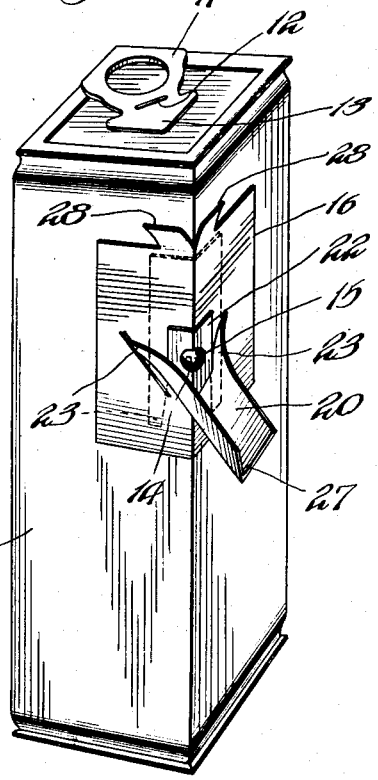
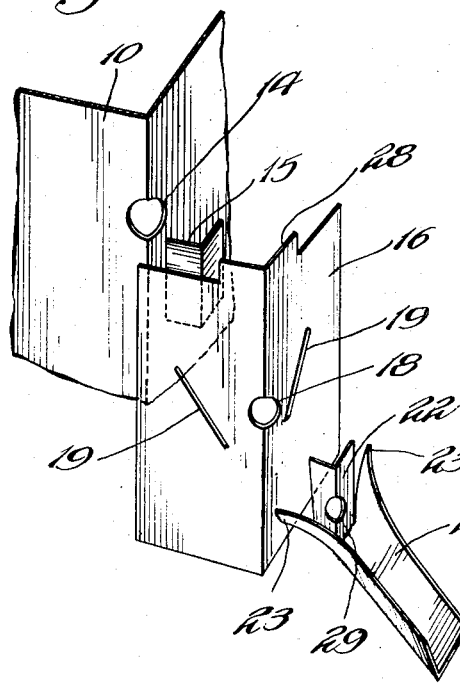
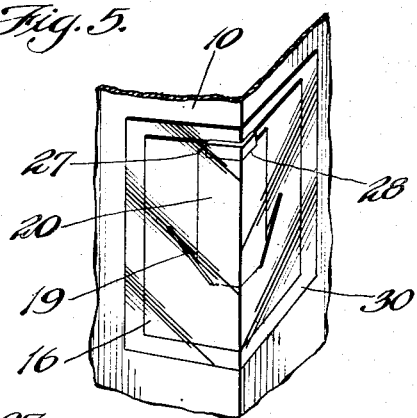
INVENTOR:
Eugene C. Steffens
BY
ATTORNEY.

Patented July 11, 1944

2,353,521

UNITED STATES PATENT OFFICE 2,353,521

MILK BOTTLE CREAM DISPENSER

Eugene C. Steffens, Oak Park, Ill.

Application February 10, 1941, Serial No. 378,147

2 Claims. (Cl. 222—530)

This invention relates in general to a provisional dispenser in connection with a bottle, box or other container, and is more particularly described as a cream dispenser for paper containers now commonly used for milk and cream.

An important object of the invention is in the provision of an auxiliary or supplemental discharge opening below the normal top or pouring opening of a container so that the upper portion or the cream which normally rises to the top of a container and above the milk therein, may flow or drain from the container down to the upper level of the milk without mixture of the milk and cream, thereby readily separating the cream from the milk.

A further object of the invention is in the provision of an auxiliary discharge opening with a foldable spout normally covering the opening, but movable to guide liquid drained or discharged therefrom.

A still further object of the invention is in the provision of an auxiliary discharging opening below the top of the container which is normally sealed and the seal protected by a spout member foldable compactly against the container which recloses the opening after the seal has been broken so that the top or normal pouring opening can be used for discharging all or the remainder of the contents of the container.

A still further object of the invention is in the provision of a container having two discharge openings, one at the top and one at a distance below the top, the openings being at opposite sides so that the liquid can be discharged from either opening.

Other objects of the invention will appear in the specification and will be apparent from the accompanying drawing in which, Fig. 1 is a perspective view of a milk bottle or container of the paraffined or waxed paper type to which the present invention is applied;

Fig. 2 is a plan view of the blank of which the pouring spout is made;

Fig. 3 is a plan view of the blank forming the spout mounting;

Fig. 4 is a perspective of the parts forming the auxiliary spout in spaced apart relation; and Fig. 5 is a detail perspective showing the assembled parts of Fig. 4 in their closed or sealing position and with a transparent protecting cover.

One of the objections to the so called paper milk bottle now coming into more general use is that it is difficult or impossible to remove the upper layer of cream which rises to the top of the milk without mixing it more or less with the milk. This is occasioned partly by the fact that the material of the container is more or less opaque so that the height of the cream line is not clearly visible from the outside, and because the opening is not flush with the side, so that in pouring, a certain amount remains below the lower edge of the pouring aperture. For most grades of milk, the cream line is approximately constant so that by locating an aperture just above the cream line, all of the cream will flow or drain from the container without disturbing the milk below it. The present invention therefore consists in the provision of an auxiliary cream or dispensing opening located at a distance from the top and opposite the normal pouring aperture of the container so that cream may drain, flow or be discharge therefrom.

Referring now more particularly to the drawing, a milk container or liquid receptacle 10 is shown in Fig. 1, rectangular in shape and preferably made of paraffined or waxed paper or similar material not designed or intended for reuse. At the upper end is a regular pouring aperture, closed by a tab seal 11, usually having a staple 12 for additionally securing it in closed position and a projecting extremity 13 providing a finger-hold engagement for disengaging the staple and removing the seal.

At the opposite edge or corner of the receptacle, and at a distance below the top thereof is an auxiliary opening 14 which extends in the walls at a short distance at each side of the corner, and is located below the top just above the cream line, that is, at the line where the cream normally is separated from the milk in a container of that size and for the grade and kind of milk in question.

Over the opening 14, a seal 15 is attached at both sides of the corner and spanning the opening 14, usually made of waxed paper or other material which is non-absorbent and leak-proof.

Extending over and covering the seal 15 is a guard and spout mounting 16 made of paper or similar material, of considerably larger extent than the seal, adapted to be applied over the corner and overlapping the seal. It is preferably secured about its edges, or some of them, to the container by means of an adhesive 17 or other suitable attaching means. At approximately the center of the guard is a perforation 18 which registers with the perforations 14 of the container. Extending angularly downward at both sides and below the opening 18 are open slots 19.

A spout 20 is formed of a blank of waxed paper or similar material, as shown in Fig. 2, having converging cuts 21 extending inwardly from one end to provide an attaching portion 22 with narrower tongues 23 at each side, the attaching portion having a transverse hinging line 24, and a longitudinal folding line 25 extending lengthwise of the blank. The attaching portion 22 is applied over the opening 18 by the adhesion of the wax paper to the guard member 16 or by means of an adhesive 26, and the extremities of the tongues 23 are disposed in the slots 19. The spout portion is folded upwardly on the hinge line 24 against the attaching portion 22 and overlapping it and the corner as shown more clearly in Fig. 5, the extremities of the tongues 23 in this position being disposed downwardly within the guard member 16 as indicated in the dotted outline in Fig. 1. In this position, the outer edge 27 of the spout is adjacent or just below the upper edge of the guard member 16, and the guard member is preferably formed with a folding tab 28 which is bent downwardly, overlapping this outer edge 27 of the spout, holding it normally in position, and the tab may be broken, as shown in Fig. 1, to release the end of the spout.

In this assembled position, the opening 14 in the container is protected by the seal 15, and by the pouring spout which overlaps the attaching portion 22. The attaching portion preferably has a perforation 29 which registers with perforations 14 and 18.

In order to make the auxiliary opening available for use, it is necessary to perforate the seal 15, which is done by means of any sharp instrument easily inserted through the seal. The location of this opening is not apparent when the spout is closed, and the spout is held in closed position by the foldable tab 28 so that the latter must be raised or broken before the spout can be moved downwardly into pouring position and to uncover the sealed opening. By tearing or disrupting the tab 28 as shown in Fig. 1, the outer edge 27 of the spout is freed for engagement so that it may be turned downwardly about the folding line 24, the projecting tongues 23 riding upwardly and outwardly in the slots relative to the pouring aperture which spreads the sides of the spout and causes them to be opened apart in pouring position.

If desired, a safety cover 30 of Cellophane or similar transparent, or opaque material may be applied over the entire auxiliary opening, seal, and spout assembly, as shown in Fig. 5, the cover overlapping the guard member 16 at the edges, adhering to the container, and being first removed before the spout is turned downwardly.

With this construction, the entire contents of the milk bottle may be discharged from the top or regular pouring aperture, or the cream only may be dispensed from the auxiliary opening. The container is placed in upright position until the cream has separated from the milk at the top thereof, and if the auxiliary opening is accurately located, practically all of the cream can be drained therefrom without including any quantity of the milk. The remaining milk may then be separately drawn off either through the auxiliary aperture or through the regular discharge opening at the top thereof, the location of the pouring openings at opposite sides of the container making this readily possible.

Although described only in connection with the separation of cream from milk in a rectangular container, this same method of decantation may also be employed in round or other containers for milk or other liquids. It may also be utilized in containers for other materials such as salt, sugar and other commodities, the auxiliary spout being located at various distances below the top or above the bottom of the container for different purposes, as for indicating, when near the bottom that the container is nearly empty.

I claim:

1. An angular receptacle and a corner pouring spout therefor comprising a first sheet material adhesively attached over one corner of the receptacle and having a pouring aperture therein to register with an opening in the corner of the receptacle, said first sheet having slots inclined toward each other at the bottom and located at opposite sides of the opening, and a foldable spout member comprising a rectangular second sheet material with a pouring opening near one end and slits extending inwardly from the end at opposite sides of the opening to form outer tongues and a fold line at the inner ends of the slit, the portion defined by the fold line and the slits being adhesively attached over the corner of the receptacle to the outer side of the first attached sheet material, the openings of the two sheets registering with each other, the said tongues of the second sheet being inserted in the slots of the first sheet, and the remainder of the second sheet being foldable upwardly against and over the corner opening to close it while maintaining the extremities of the tongues in the slots, and the tongues moving upwardly in the slots to spread the upper portion of the pouring member in moving it downwardly to pouring position.

2. A structure, in accordance with claim 1, in which a perforable seal is applied between the receptacle and the first piece of sheet material to seal the pouring opening, the said sheet material being adhesively applied about its edges only adjacent to said slots so that the ends of the tongues of the pouring member may move freely in the slots and between the sheet material and the receptacle to which it is adhesively applied, and means at the top of the sheet material for engaging over the upper end of the spout and holding it against the corner of the container in closed position.

EUGENE C. STEFFENS.